Patented Dec. 3, 1935

2,023,253

UNITED STATES PATENT OFFICE 2,023,253

RUBBER AND RUBBERIZED SANITARY GARMENT

Jacob Stein, Brooklyn, N. Y., and Hugh H. Mosher, Grantwood, N. J.

No Drawing. Application August 20, 1932, Serial No. 629,760

REISSUED

6 Claims. (Cl. 106—23)

The present invention relates to rubber or rubberized garments, or like articles, such as shoes, dolls, bed sheets, dress shields, baby pants and numerous other commodities, which come in contact with the body or are subjected to body emissions, and which rubber or rubberized articles have compounded therewith an antiseptic ingredient or combination of antiseptic ingredients.

The object of the present invention is broadly a rubber or rubberized garment or article of the above stated character which will be antiseptic or prevent culture of a large variety of fungi or bacteria; and more specifically the provision of such rubber and rubberized garment or article having an antiseptic substance or substances incorporated therein in such a manner as will always be present during the life of the article and available in an efficacious state and amounts in the presence of alkaline solutions so as to inhibit development of or destroy fungi or bacteria commonly already in or which may develop in body emissions.

One of the desiderata after conception of the broad invention was to find those antiseptic elements, compounds or substances which would not only be compatible in a rubber compound but which would compound with or incorporate in the rubber in a manner to be present and leach out in sufficient quantities to destroy or inhibit growth of fungi and bacteria, reduce the pungent odors usually attendant with the wearing of rubber garments, and to overcome the irritating effects of body secretions.

Furthermore, it was a desideratum in the present invention to preferably find antiseptic substances which may be handled in a rubber compound and which would perform, as above stated, in the presence of an alkaline condition, because the present invention is an addition or improvement upon the disclosures in co-pending applications Ser. No. 529,034 of Jacob Stein and Ser. No. 590,524 of Jacob Stein and Hugh H. Mosher, for the purpose of producing a rubber or rubberized garment which may be worn next to or near the skin of the body without the irritating and discomforting effects and odors resulting from perspiration and the end products of protein metabolisms.

The particular garments or articles to which the present invention pertains are rubber crib and hospital sheets, baby pants, bloomers, ladies' sanitary articles, reducing girdles or corsets, bathing caps, bathing shoes, dolls, and numerous others, and to which the application of the present invention will be obvious in the light of the present disclosure.

It is found that the objects of the present invention may be accomplished, preferably, by combining salicylamide (and commonly known in the trade as "shirlin") with any desired rubber compound or mix, while the rubber compound is being masticated or milled; but it is preferred that the rubber compound shall also have incorporated throughout its mass a water soluble basic ingredient, such as sodium carbonate, or sodium bicarbonate, borax, di-sodium phosphate, tri-sodium phosphate or sodium silicate or the corresponding potash and ammonium salts, for the purpose of neutralizing the acidity in body emissions and absorbing certain end products of protein metabolisms present in body emissions and which cause an irritating, unhealthy and uncomfortable condition when wearing rubber garments.

While salicylamide is the preferred antiseptic ingredient of the improved rubber composition, as shown by the specific example given above, nevertheless, it has been discovered that certain other antiseptic substances may be substituted for the salicylamide. These substitutes include: chlorothymol; parachloridphenol; hexaresorcinol; and a number of essential oils, such as oil of violet, thymol, or pineol, and similar groups, or any combination of these ingredients.

Applicant has discovered that these substitutes for salicylamide are compatible with the rubber compound and also are effective for the above purposes even after combination with the rubber mix and, also, where the rubber mix contains the water soluble alkaline substance, as specified above.

This soluble alkaline substance may be sodium carbonate of approximately 3 to 5% by weight of rubber mixed; or may be borax in the same proportions. However, it is found that amounts from 1% to 20% by weight may be used with favorable results.

Also, the rubber mixture may contain the following ingredients for the purpose of absorbing the end products of body metabolisms, colloidal silica ½ of 1% to 15% by weight of the rubber mix and sodium silicate ½ of 1% to 10% by weight or rubber mix.

In place of the borax and sodium carbonate, di-sodium phosphate, tri-sodium phosphate, or sodium acetate may be substituted in the same proportions. However, the other above ingredients may be used in such proportions and amounts to best accomplish the best above stated results for the uses to which the particular garment or article in which they are embodied is employed. It is found, however, that the salicylamide, the parachloridphenol, and the hexaresorcinol may be used in amounts from ½ of 1% to 25% by weight of the rubber compound, but it being preferable in ordinary cases to use from 3 to 5%. The chlorothymol and the essential oils above mentioned may be used from ¼ of 1% to 15% by weight of the rubber compound with a preference for ordinary uses of 1%. The essential oils, being liquid, are added to the rubber compound or mixture as above stated during the milling of the compound and fills the interstices between the rubber particles and, in effect, produces microscopic liquid filled cells throughout the entire area and thickness of the rubber compound, and gradually leaches out in the finished product to serve the purposes mentioned. The chlorothymol being in crystalline form at normal temperatures may melt or dissolve during the mastication of the rubber mixture, and after incorporation and dispersion throughout the entire rubber mass may again solidify until subjected to the moisture and heat from body emissions when it will leach from the rubber in the finished article. The salicylamide parachloridphenol and the hexaresorcinol are in powder form when added to the rubber mixture during the milling process and become dispersed in the same manner as the sodium carbonate throughout the entire rubber mass and dissolves in the presence of the moisture from body emissions and gradually leaches from the garment.

The rubber mix may include coagulated latex, gutta percha, balata or any other equivalent coagulated saps or juices obtained from plants or the like; any suitable catalyst or accelerator if desired; sulphur; and a filler, if desired. The catalyst or accelerator may be of any accepted material, such as tetramethylthicurea disulphide, diphenylguanidine or paranitrosodimethylamine, aniline, mercaptobenzothrazole reaction product of diphenylguanidine; and the filler may be of any suitable material such, for instance, as talc, china clay, finely divided silica, and mixtures of various fillers to give special properties.

In order to obtain a thorough mixture and dispersion of the above ingredients in the rubber compound, it is preferred to add them at or before the time the rubber compound is milled. After milling the rubber compound containing the above ingredients, it may be manipulated or calendered in the same manner as ordinary rubber mixtures.

While certain other phenols, cresols and derivatives of the same, and fluosilicates may be used to impart germicidal properties to the rubber compound, it has been found that the salicylamide is particularly useful for the present purposes because of its efficaciousness as a germicide in alkaline solutions and cooperates with the sodium carbonate or other ingredients, when used in the compound, in such manner as to give the best results.

Tests of garments made in accordance with applicants' invention and with a large variety of molds and bacteria, notable of which were the *Aspergillis niger*, as typical of fungi, and colli, as representative of the pathogenic bacterial groups and one more resistive to germicides than the average, and these were rendered sterile and no development or culture occurred with either the fungal or bacterial groups after a period of one week at a temperature of 37° C. Similar tests were conducted on untreated sheets of rubber and the cultures were not destroyed and propagation was inhibited only by lack of suitable nutritive media.

The applicants' products have the power of neutralizing acids and absorbing body excretory products, which facts may be of considerable interest from the viewpoint of preserving the health of the wearer; that the rubberized products are more resistant against deterioration due to aging in the presence of urine than any of the competitive products studied, and the increase in life was found to be between thirty and forty percent.; and that the odors have been reduced materially over those usually attendant with garments produced from rubber or rubberized material under conventional manufacturing conditions.

While the rubber compound disclosed in this specification has been described particularly in connection with rubber or rubberized garments, wearing apparel or the like, it is susceptible to any use where it is desired to neutralize acid and absorb body excretions produced in the neighborhood of the material of the article made of the rubber compound. Consequently, it is to be understood that the invention is susceptible to various changes as noted hereinabove and which fall within the scope of the appended claims.

Having thus described the invention and in what manner the same is to be performed, what is claimed as new is:

1. As a new article of manufacture, an article of wearing apparel having sheet rubber parts adapted for wear adjacent the body emissions, said rubber parts having incorporated therein and dispersed throughout a substantial proportion of water soluble basic agents for neutralizing acids and for absorbing and neutralizing the end products of human protein metabolisms, and salicylamide.

2. As a new article of manufacture, an article of wearing apparel having sheet rubber parts adapted for wear adjacent the body emissions, said rubber parts including sodium carbonate, and salicylamide, said ingredients being dispersed through the rubber and being leachable from the rubber in the presence of body emissions.

3. As a new article of manufacture, an article of wearing apparel having sheet rubber parts adapted for wear adjacent the body emissions, said rubber parts having incorporated therein and dispersed throughout a substantial proportion of water soluble basic agents for neutralizing acids and for absorbing and neutralizing the end products of human protein metabolisms, and antiseptic substances selected from the following group: salicylamide, chlorothymol, parachloridphenol, hexaresorcinol, oil of violet, thymol, pineol; phenols, cresols and derivatives of the same, and fluosilicates.

4. As a new article of manufacture, an article of wearing apparel having sheet rubber parts adapted for wear adjacent the body emissions, said rubber parts including salicylamide incorporated therein and dispersed throughout.

5. As a new article of manufacture, an article of wearing apparel having sheet rubber parts adapted for wear adjacent the body emissions, said rubber parts having incorporated throughout the mass thereof antiseptic substances selected from the following group: salicylamide, chlorothymol, parachloridphenol, hexaresorcinol, oil of violet, thymol, pineol; phenols, cresols and derivatives of the same, and fluosilicates.

6. As a new article of manufacture, an article of wearing apparel having rubber parts adapted for wear adjacent body emissions, said rubber parts having incorporated throughout the mass thereof, a soluble alkaline substance and an antiseptic substance selected from the following group: salicylamide, chlorothymol, parachloridphenol, hexaresorcinol, oil of violet, thymol, pineol, phenols, cresols and derivatives of the same, and fluosilicates.

JACOB STEIN.
HUGH H. MOSHER.